(12) United States Patent
Shiraishi et al.

(10) Patent No.: US 10,155,564 B2
(45) Date of Patent: Dec. 18, 2018

(54) BICYCLE BOTTOM BRACKET ASSEMBLY

(71) Applicant: Shimano Inc., Sakai, Osaka (JP)

(72) Inventors: Shingo Shiraishi, Osaka (JP); Takashi Furuya, Osaka (JP); Etsuyoshi Watarai, Osaka (JP); Yoshiaki Ando, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/343,561

(22) Filed: Nov. 4, 2016

(65) Prior Publication Data

US 2017/0073038 A1 Mar. 16, 2017

Related U.S. Application Data (62) Division of application No. 14/745,878, filed on Jun. 22, 2015, now Pat. No. 9,517,811.

(51) Int. Cl.
| | |
|---|---|
| *B62M 3/00* | (2006.01) |
| *F16C 35/077* | (2006.01) |
| *B62K 19/34* | (2006.01) |
| *F16C 19/06* | (2006.01) |
| *F16C 19/54* | (2006.01) |

(52) U.S. Cl.
CPC ............ *B62M 3/003* (2013.01); *B62K 19/34* (2013.01); *F16C 35/077* (2013.01); *F16C 19/06* (2013.01); *F16C 19/54* (2013.01); *F16C 2226/60* (2013.01); *F16C 2326/26* (2013.01); *F16C 2326/28* (2013.01)

(58) Field of Classification Search
CPC ...... F16C 27/04; F16C 27/066; F16C 35/077; F16C 35/067; F16C 9/02; F16C 2326/28; F16C 19/06; F16C 19/54; F16C 2226/60; F16C 2326/26; Y10T 74/2164; Y10T 74/2165; B62M 3/003; B62K 19/34
See application file for complete search history.

(56) References Cited

U.S. PATENT DOCUMENTS

| | | | |
|---|---|---|---|
| 547,629 A | 10/1895 | Cullmann | |
| 651,662 A | 6/1900 | Hawds | |
| 1,778,258 A * | 10/1930 | Jennings | F16C 35/067 384/540 |
| 3,578,829 A | 5/1971 | Hata | |

(Continued)

FOREIGN PATENT DOCUMENTS

| | | | |
|---|---|---|---|
| CN | 103382962 A | 11/2013 | |
| FR | 516502 A * | 4/1921 | F16C 27/04 |

*Primary Examiner* — Alan B Waits
(74) *Attorney, Agent, or Firm* — Global IP Counselors, LLP (57) ABSTRACT

A bicycle bottom bracket assembly having a rotational central axis includes a support member, a bearing unit and a radially inward force reducing structure. The support member includes a hanger mounting portion and a bearing mounting portion. The bearing mounting portion is configured to be at least partly positioned within a hanger part of a bicycle frame. The bearing unit includes an outer race, an inner race and at least one roller element disposed between the outer and inner races in a radial direction with respect to the rotational central axis. The outer race is fixed to the bearing mounting portion of the support member. The radially inward force reducing structure reduces a radially inward force being transmitted to the bearing unit.

7 Claims, 8 Drawing Sheets

(56) References Cited

U.S. PATENT DOCUMENTS

| | | | |
|---|---|---|---|
| 4,252,384 A * | 2/1981 | Duvoisin | B62K 19/34 384/431 |
| 4,651,590 A * | 3/1987 | Thun | B62K 19/34 384/458 |
| 4,825,719 A | 5/1989 | Romano | |
| 5,476,327 A | 12/1995 | Chiang | |
| 5,632,561 A | 5/1997 | Chi | |
| 5,975,768 A | 11/1999 | Hoffman et al. | |
| 6,053,638 A * | 4/2000 | Muraki | F16C 27/04 384/513 |
| 6,095,691 A | 8/2000 | Chiang | |
| 6,386,765 B1 | 5/2002 | Chiang | |
| 6,474,192 B2 | 11/2002 | Lin | |
| 6,755,095 B2 * | 6/2004 | Yamanaka | B25B 15/005 74/594.1 |
| 6,988,427 B2 * | 1/2006 | Yamanaka | B25B 27/0071 384/545 |
| 7,503,700 B2 * | 3/2009 | Yamanaka | B62M 3/003 384/545 |
| 7,517,155 B2 * | 4/2009 | Stout | F16C 23/04 384/535 |
| 7,610,832 B2 | 11/2009 | Dal Pra' | |
| 8,246,064 B2 * | 8/2012 | Kuroiwa | B62M 3/003 280/261 |
| 8,267,417 B1 * | 9/2012 | Yamanaka | B62M 3/003 280/259 |
| 8,393,794 B1 * | 3/2013 | Shiraishi | B62K 19/34 384/458 |
| 8,523,453 B2 * | 9/2013 | Loeschner | F16C 19/49 384/455 |
| 8,590,421 B2 * | 11/2013 | Meggiolan | B62K 19/34 384/458 |
| 8,851,759 B2 * | 10/2014 | Bussit | F16C 19/06 384/536 |
| 9,228,613 B2 | 1/2016 | Shiraishi | |
| 2002/0096015 A1 * | 7/2002 | Smith | B62M 3/003 74/594.1 |
| 2015/0329170 A1 * | 11/2015 | Kondo | B62M 3/003 74/594.1 |

* cited by examiner

BICYCLE BOTTOM BRACKET ASSEMBLY

CROSS-REFERENCE TO RELATED APPLICATIONS

This application is a divisional application of U.S. patent application Ser. No. 14/745,878 filed on Jun. 22, 2015. The entire disclosure of U.S. patent application Ser. No. 14/745,878 is hereby incorporated herein by reference.

BACKGROUND

Field of the Invention

This invention generally relates to a bicycle bottom bracket assembly. More specifically, the present invention relates to a bicycle bottom bracket assembly having a radially inward force reducing structure for reducing a radially inward force being transmitted to the bearing unit.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle bottom bracket, which is often called a bottom bracket.

Generally speaking, a conventional bicycle has a pair of wheels mounted to a diamond-shaped main frame formed of a plurality of tubes and a front fork pivotally connected to the main frame. The tubes of the main frame typically include a top tube, a down tube, a head tube, a seat tube, a pair of seat stays, a pair of chain stays and a cylindrical or tubular hanger part. The tubes of the main frame are fixedly coupled together to form a front triangularly shaped part and a rear triangularly shaped part that is arranged rearward of the front triangularly shaped part. The front and rear triangularly shaped parts serve as the framework of the bicycle body with a rear wheel mounted to the rear triangularly shaped part by a rear axle. The front fork is pivotally supported on the front triangularly shaped part such that the from fork can rotate freely about an axis that is tilted slightly from vertical. The front fork has a front wheel coupled thereto by a front axle.

The cylindrical or tubular hanger part of the frame is often called a bicycle bottom bracket banger because it supports a bottom bracket assembly. Many different types of bottom bracket assemblies are currently available on the market. Generally speaking, a conventional bicycle bottom bracket assembly has a pair of bearing units mounted into a tubular hanger part of a bicycle frame for rotatably supporting a crank axle. One type of a conventional crank axle assembly is disclosed in U.S. Pat. No. 6,983,672. This conventional crank axle assembly is equipped with first and second support members that have first and second bearing units, respectively. The first and second support members are screwed into both end portions of the hanger part separately. The crank axle is rotatably supported on both of the first and second bearing units, and right and left cranks are non-rotatably mounted on the both axial end portions of the crank axle. Sometimes the first and second support members are press-fitted in to both end portions of the banger part. One example of a conventional crank axle assembly that has the first and second support members press-fitted into the hanger part is disclosed in U.S. Pat. No. 7,503,700.

However, the first and second support members can be deformed radially inwardly due to a tightening force when the first and second support members are mounted in the hanger part of the bicycle frame. The deformation force tends to be larger when the first and second support members are made of a resin material. For example, when the first and second support members are screwed into the hanger part, the screwing force imparts a radially inward force that deforms the first and second support members radially inwardly. When the first and second support members are press-fitted into the hanger part, the press-fitting imparts a radially inward force that deforms the first and second support members radially inwardly. The radially inward deformation of the first and second support members negatively affects operation of the bearing units such that increased rotational torque is required to be exerted by the cyclist on the first and second cranks. Additionally, such deformation can damage the bearing units and shorten the service life thereof.

In view of the above, it will be apparent to those skilled in the art from this disclosure that there exists a need for an improved bicycle bottom bracket assembly. This invention addresses this need in the art as well as other needs, which will become apparent to those skilled in the art from this disclosure.

SUMMARY

Generally, the present disclosure is directed to various features of a radially inward force reducing structure of a bicycle bottom bracket assembly. An object of the present invention is to provide a radially inward force reducing structure for reducing a radially inward force being transmitted to the bearing unit.

In view of the state of the known technology and in accordance with an aspect of the present invention, a bicycle bottom bracket assembly is provided including a support member, a bearing unit and a radially inward force reducing structure. The bicycle bottom bracket has a rotational central axis. The support member includes a hanger mounting portion and a bearing mounting portion. The bearing mounting portion is configured to be at least partly positioned within a hanger part of a bicycle frame. The bearing unit includes an outer race, an inner race and at least one roller element disposed between the outer and inner races in a radial direction with respect to the rotational central axis. The outer race is fixed to the bearing mounting portion of the support member. The radially inward force reducing structure reduces a radially inward force transmitted to the bearing unit.

These and other objects, features, aspects and advantages of the present invention will become apparent to those skilled in the art from the following detailed description, which, taken in conjunction with the annexed drawings, discloses illustrative embodiments.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Figure 1:
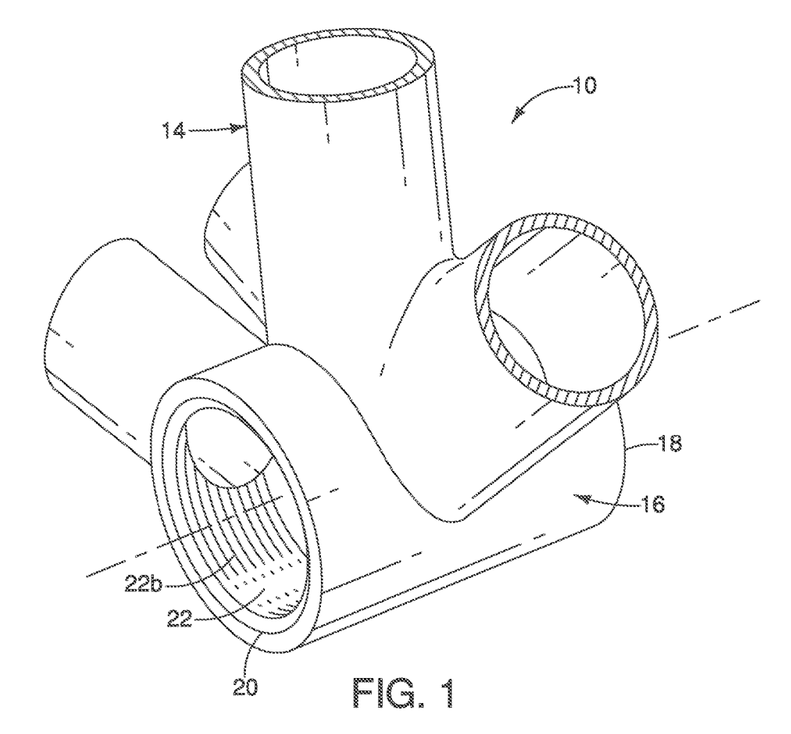
FIG. 1 is a perspective view of a tubular hanger part of a bicycle frame configured to threadably receive a support member.
Figure 2:
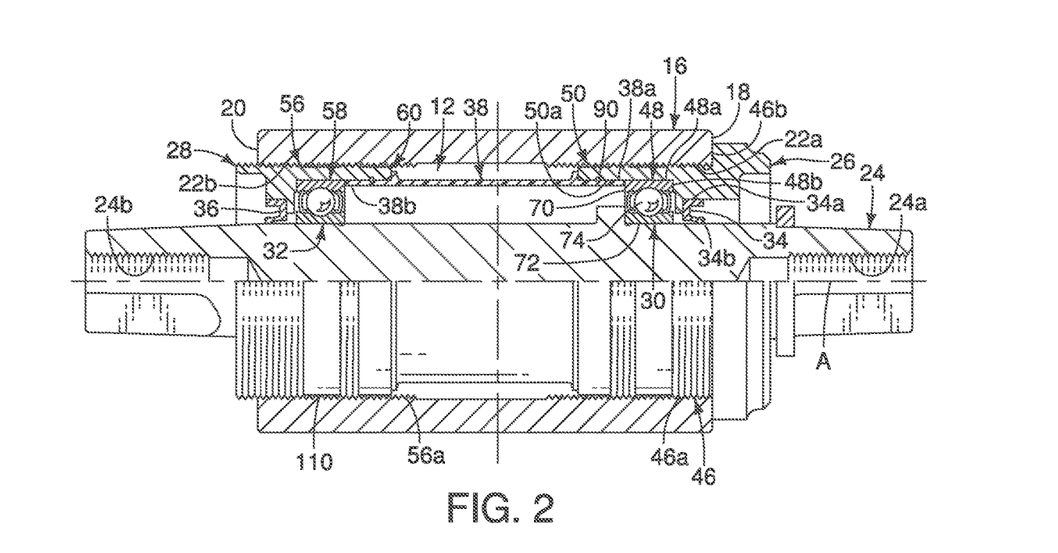
FIG. 2 is a cross sectional view of a bicycle bottom bracket assembly received by the tubular hanger part illustrated in FIG. 1 in accordance with a first exemplary embodiment in which a support member includes a non-threaded outer circumferential surface.
Figure 3:
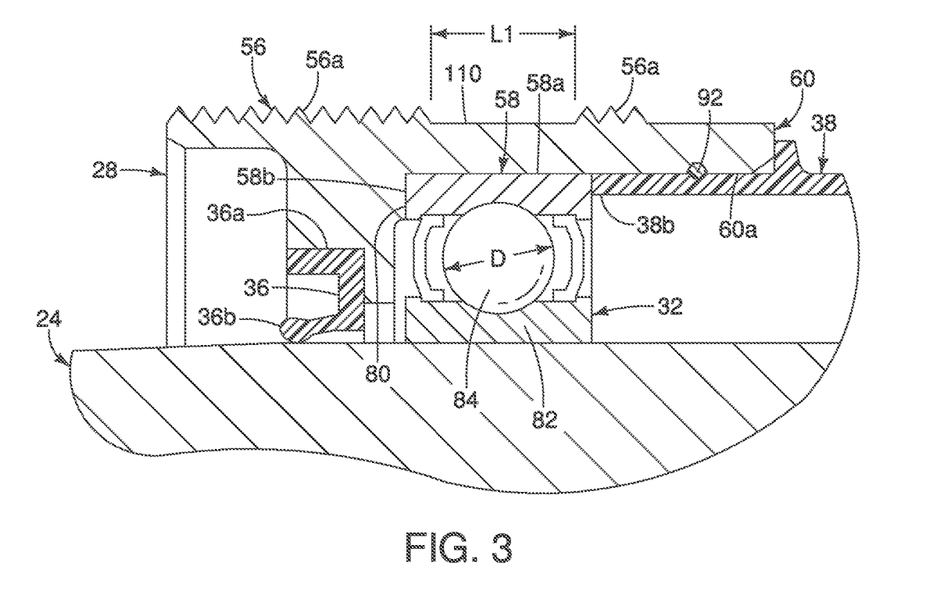
FIG. 3 is an enlarged cross sectional view of the bicycle bottom bracket assembly illustrated in FIG. 2.

Referring initially to FIGS. 1 to 3, a portion of a bicycle 10 is illustrated with a bicycle bottom bracket assembly 12 installed in a bicycle frame 14 of the bicycle 10 in accordance with a first bottom bracket embodiment. The bicycle bottom bracket assembly 12 has a rotational central axis A. A tubular hanger part 16 of the bicycle frame 14 is made of a hard, rigid material that is typically used in manufacturing bicycle frames. The tubular hanger part 16 has a first open end 18, a second open end 20 and a cylindrical surface 22. The cylindrical surface 22 extends between the first and second open ends 18 and 20 of the tubular hanger part 16. The cylindrical surface 22 has a first threaded portion 22a and a second threaded portion 22b. The first threaded portion 22a is located adjacent the first open end 18, while the second threaded portion 22b is located adjacent the second open end 20.

The bicycle bottom bracket assembly 12 rotatably supports a crank axle 24 within the tubular hanger part 16. In particular, the bicycle bottom bracket assembly 12 includes a first support member 26, a second support member 28, a first bearing unit 30 and a second bearing unit 32 for rotatably supporting the crank axle 24 within the tubular hanger part 16. In the first illustrated bottom bracket embodiment, the bicycle bottom bracket assembly 12 is further provided with a first sealing structure 34 that is associated with the first support member 26 and the first bearing unit 30 for preventing the ingress of water and/or other contaminates from reaching the first bearing unit 30. Likewise, the bicycle bottom bracket assembly 12 is further provided with a second sealing structure 36 that is associated with the second support member 28 and the second bearing unit 32 for preventing the ingress of water and/or other contaminates from reaching the second bearing unit 32. Preferably, the bicycle bottom bracket assembly 12 may further be provided with a connecting tube member 38 extending between the first and second support members 26 and 28.

Basically, in the first illustrated bottom bracket embodiment, left and right ends of the bicycle bottom bracket assembly 12 are substantially mirror images of each other, and have a common rotational central axis A. Specifically, the first and second support members 26 and 28 are substantially similar, the first and second bearing units 30 and 32 are identical, and the first and second sealing structures 34 and 36 are identical. As shown in FIG. 2, the first support member 26 can include a radially extending annular abutment 46b to limit an insertion depth of the first support member 26 through the first open end 18 in the hanger part 16. While these parts are illustrated as being substantially similar, it will be apparent to those skilled in the bicycle field that they can be different if needed and/or desired.

Basically, in the first illustrated bottom bracket embodiment, the first and second support members 26 and 28 are threaded into the first and second open ends 18 and 20 of the tubular hanger part 16, respectively. The first and second bearing units 30 and 32 are configured and arranged to rotatably support the crank axle 24 within the tubular hanger part 16 about the rotational central axis A via the first and second support members 26 and 28. The first and second sealing structures 34 and 36 prevent contamination, such as water, muddy water and so on, from reaching the first and second bearing units 30 and 32.

In the first illustrated bottom bracket embodiment, the first and second bearing units 30 and 32 are press-fitted into the first and second support members 26 and 28, respectively. The terms "press fitted" or "press fit" as used herein refers to fastening two parts together by friction after the parts are longitudinally pushed together, rather than by any other means of fastening. More preferably, the friction of the press-fit connection that holds the two parts together is preferably increased by compression of one part against the other, which relies on the tensile and compressive strengths of the materials from which the two parts are made.

Preferably, the crank axle 24 is removable from the first and second bearing units 30 and 32 in an axial direction of the rotational central axis A without removing the first and second bearing units 30 and 32 from the first and second support members 26 and 28. In the first illustrated bottom bracket embodiment, the crank axle 24 is a hollow pipe-shaped member that is highly rigid. For example, the crank axle 24 is made of a metallic material, such as chrome molybdenum steel. As shown in FIG. 2, a first or right end portion of the crank axle 24 includes a female or internal thread 24a and a second or left end portion of the crank axle 24 includes a female or internal thread 24b. Fastening bolts (not shown) threadably received by the threads 24a and 24b secure right and left crank arm (292 and 294 in FIG. 12) to the crank axle 24. Alternatively, the left and right crank arms are non-rotatably connected to the crank axle in any suitable manner (e.g., threads, crimping, bonding, welding, etc.). The pedals are mounted to the tips or free ends of the right and left crank arms.

Turning now to FIG. 2, the first support member 26 will now be discussed in more detail. In the first illustrated bottom bracket embodiment, the first support member 26 is constructed of a metallic material as a one-piece, unitary member. In the first illustrated bottom bracket embodiment, as seen in FIG. 2, the first support member 26 includes a first hanger mounting portion 46 and a first bearing mounting portion 48. Preferably, the first support member 26 further includes a first connecting tube mounting part 50. The first support member 26 is sometimes called an adapter member. The first support member 26 can be made of any suitable material, such as aluminum or glass-fiber reinforced polyamide.

As seen in FIG. 2, the first hanger mounting portion 46 has a threaded outer circumferential surface 46a (i.e., an external thread) that is configured and arranged to be inserted into the open end 20 and threadably received by the first threaded portion 22a of the tubular hanger part 16. The first hanger mounting portion 46 also has the annular abutment 46b. The annular abutment 46b projects outward from the first outer circumferential surface 46a in a radial direction with respect to the rotational central axis A. As seen in FIG. 2, the annular abutment 46b abuts against the first open end 18 of the hanger part 16 of the bicycle frame 14.

As seen in FIG. 2, the first bearing unit 30 is press-fitted into the first bearing mounting portion 48 of the first support member 26. The first bearing mounting portion 48 has a recess that is defined by an inner circumferential surface 48a and an axially facing surface 48b. The circumferential surface 48a is dimensioned to be equal to or slightly smaller than the outer diameter of the first bearing unit 30 so that the first bearing unit 30 is retained in the recess of the first bearing mounting portion 48 by a press-fit. The first bearing mounting portion 48 is configured to be at least partly positioned within, the hanger part 16 of the bicycle frame 14, as seen in FIG. 2. In the illustrated embodiment the first bearing mounting portion 48 is entirely positioned within, the hanger part 16 of the bicycle frame 14.

A first connecting tube mounting part 50 extends axially inward from the first hanger mounting portion 46 of the first support member 26. The first connecting tube mounting part 50 is dimensioned to receive a first end 38a of the connecting tube member 38 as seen in FIG. 2. The first connecting tube mounting part. 50 has an inner peripheral surface 50a. The inner peripheral surface 50a is sized to receive the first end 38a of the connecting tube member 38, preferably, in a press-fit manner.

As seen in FIG. 2, the first sealing structure 34 is operatively disposed between the first support member 26 and the first bearing unit 30 to create a seal for preventing the ingress of water and/or other contaminates from reaching the first bearing unit 30. With the first illustrated bottom bracket embodiment, the first sealing structure 34 provides a reliable sealing structure and constitutes a lower rotational torque seal structure that prevents water from reaching the first bearing unit 30.

The first sealing structure 34 is preferably an elastomeric, ring shaped member that preferably has a uniform cross sectional profile. The first sealing structure 34 has a proximal end 34a and a distal end 34b. The proximal end 34a is fixed to the first support member 26 at a location axially outward from the first bearing unit 30 with respect to the rotational center axis A of the first bearing unit 30. The proximal end 34a can be press-fitted into the first support member 26 with or without an adhesive disposed therebetween. A watertight seal is created at the interface between the surfaces of the proximal end 51a and the first support member 26. The distal end 34b slidably contacts the crank axle 24 to create a watertight seal therebetween.

Turning now to FIGS. 2 and 3, the second support member 28 will now be discussed in more detail. In the first illustrated bottom bracket embodiment, the second support member 28 is constructed of a metallic material as a one-piece, unitary member. In the first illustrated bottom bracket embodiment, the second support, member 28 includes a second hanger mounting portion 56, a second bearing mounting portion 58 and a second connecting tube mounting part 60. The second support member 28 is sometimes called an adapter member. The second support member 28 can be made of any suitable material, such as aluminum or glass-fiber reinforced polyamide.

As seen in FIGS. 2 and 3, the second hanger mounting portion 56 has a threaded outer circumferential surface 56a (i.e., an external thread) that is configured and arranged to be threaded into the second threaded portion 22b of the tubular hanger part 16.

As seen in FIGS. 2 and 3, the second bearing unit 32 is press-fitted into the second bearing mounting portion 58 of the second support member 28. As seen in FIG. 3, the second bearing mounting portion 58 has a recess that is defined by a circumferential surface 58a and an axially facing surface 58b. The circumferential surface 58a is dimensioned to be equal to or slightly smaller than the outer diameter of the second bearing unit 32 so that the second bearing unit 32 is retained in the recess of the second bearing mounting portion 58 by a press-fit. The second bearing mounting portion 58 is configured to be at least partly positioned within the hanger part 16 of the bicycle frame 14, as seen in FIG. 2. In the illustrated embodiment, the second bearing mounting portion 58 is entirely positioned within the hanger part 16 of the bicycle frame 14.

The second connecting tube mounting part 60 extends axially inward from the second hanger mounting portion 56 of the second support member 28. The second connecting tube mounting part 60 is dimensioned to receive a second end 38b of the connecting tube member 38 as seen in FIGS. 2 and 3. The second connecting tube mounting part 60 has an inner peripheral surface 60a as seen in FIG. 3. The inner peripheral surface 60a is sized to receive the second end 38b of the connecting tube member 38, preferably, in a press-fit manner.

As seen in FIGS. 2 and 3, the second sealing structure 36 is operatively disposed between the second support member 28 and the second bearing unit 32 to create a seal for preventing the ingress of water and/or other contaminates from reaching the second bearing unit 32. With the first illustrated bottom bracket embodiment, the second sealing structure 36 provides a reliable sealing structure and constitutes a lower rotational torque seal structure that prevents water from reaching the second bearing unit 32.

The second sealing structure 36 is an elastomeric, ring shaped member that preferably has a uniform cross sectional profile. The second sealing structure has a proximal end 36a and a distal end 36b. The proximal end 36a is fixed to the second support member 28 at a location axially outward from the second bearing unit 32 with respect to the rotational center axis A of the second bearing unit 32. The proximal end 36a can be press-fitted into the second support member 28 with or without an adhesive disposed in-between. A watertight seal is created at the interface between the surfaces of the proximal end 36a and the second support member 28. The distal end 36b slidably contacts the crank axle 24 to create a watertight seal therebetween.

Referring to FIG. 2, the first bearing unit 30 is an industrial type bearing unit that is press-fitted into the first support member 26 as mentioned above. The first bearing unit 30 is coupled to the first bearing mounting portion 48. The first bearing unit 30 includes an outer race 70, an inner race 72 and at least one roller element or ball 74. The at least one roller element or ball 74 is disposed between the outer and inner races 70 and 72 in a radial direction with respect to the rotational central axis A. The outer race 70 is fixed to first bearing mounting portion 48 of the first support member 26.

Referring to FIGS. 2 and 3, the second bearing unit 32 is an industrial type bearing unit that is press-fitted into the second support member 28 as mentioned above. The second bearing unit 32 is coupled to the second bearing mounting portion 58. The second bearing unit 32 includes an outer race 80, an inner race 82 and at least one roller element or ball 84. The at least one roller element or ball 84 is disposed between the outer and inner races 80 and 82. The outer race 80 of the second bearing unit 32 is fixed to the bearing mounting portion 58 of the second support member 28.

As seen in FIGS. 2 and 3, the connecting tube member 38 is a tubular member that has an inside diameter that is dimensioned so that the crank axle 24 can pass therethrough. The connecting tube member 38 extends between the first connecting tube mounting part 50 of the first support member 26 and the second connecting tube mounting part 60 of the second support member 28 in the axial direction. In particular, the connecting tube member 38 is fitted inside an inner circumferential surface of the first and second connecting tube mounting parts 50 and 60 so that the connecting tube member 38 concentrically extends between the first and second support members 26 and 28. A first O-ring member 90 is preferably disposed between the first end 38a of the connecting tube member 38 and the first connecting tube mounting part 50 of the first support member 26. A second O-ring member 92 is preferably disposed between the second end 38b of the connecting tube member 38 and the second connecting tube mounting part 60 of the second support member 26. The O-rings 90 and 92 contact the surfaces 50a and 60a to create seals therebetween, respectively, to prevent the ingress of contaminants from reaching the first and second bearing units 30 and 32.

Figure 11:
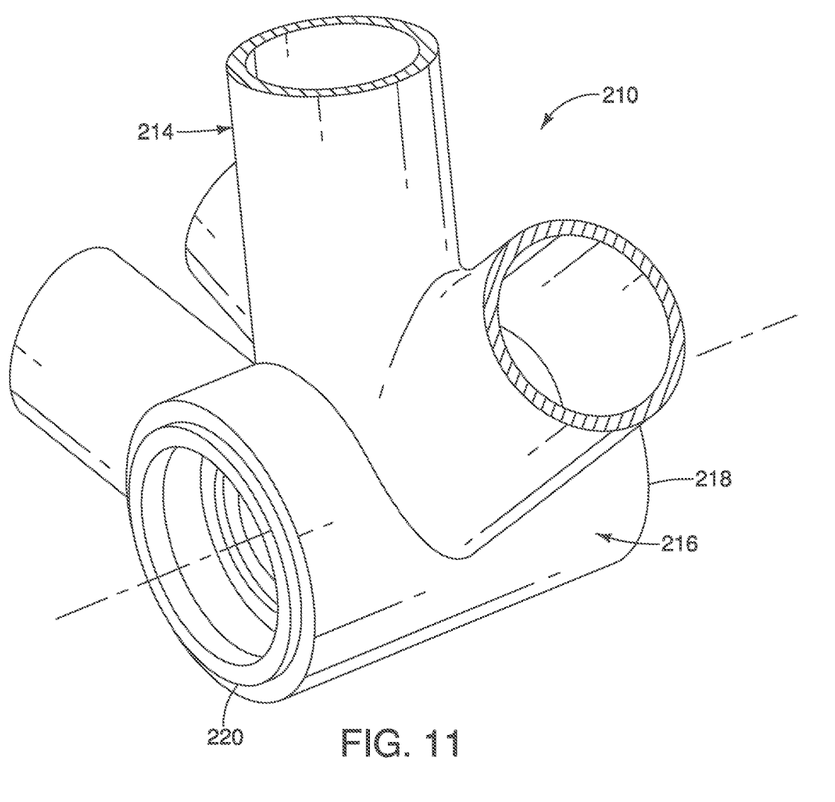
FIG. 11 is a perspective view of a tubular hanger part of a bicycle frame configured to press-fittingly receive a support member.
Figure 12:
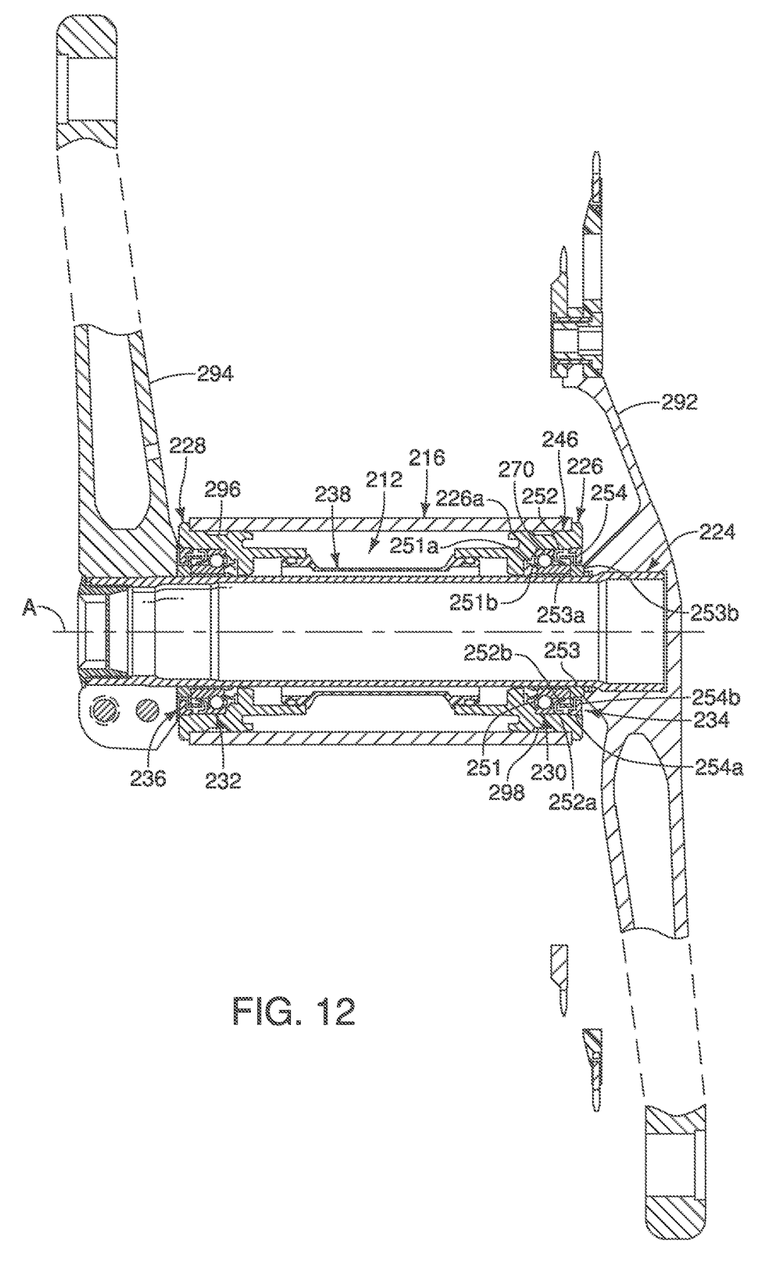
FIG. 12 is a cross-sectional view of a bicycle bottom bracket assembly received by the tubular hanger part illustrated in FIG. 11 in accordance with an eighth exemplary embodiment.
Figure 13:
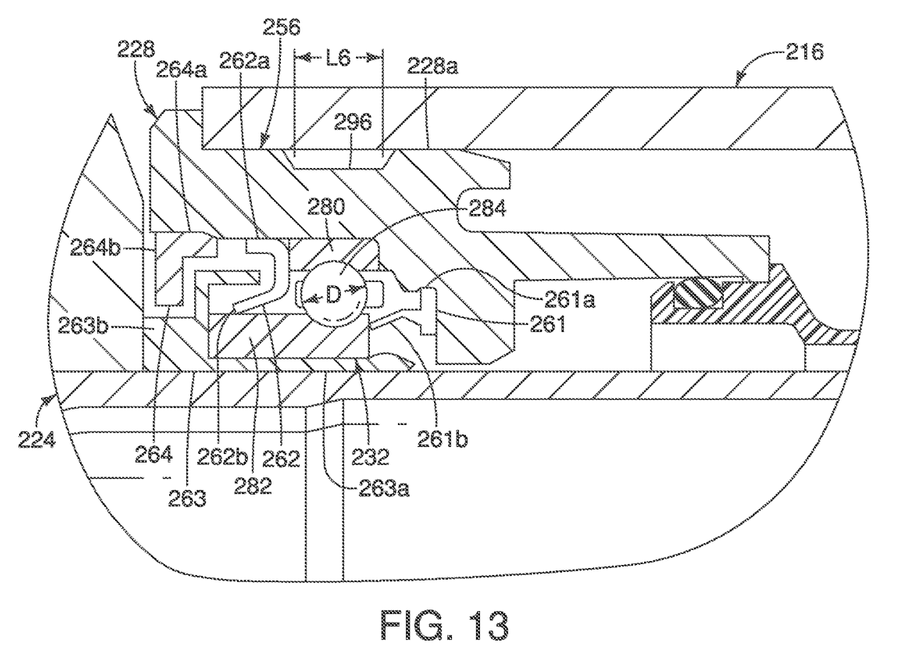
FIG. 13 is an enlarged cross sectional view of the bicycle bottom bracket assembly illustrated in FIG. 12.

Referring now to FIGS. 11 to 13, a portion of a bicycle 210 is illustrated with a bicycle bottom bracket assembly 212 installed in a bicycle frame 214 of the bicycle 210 in accordance with a second bottom bracket embodiment. A tubular hanger part 216 of the bicycle frame 214 is made of a hard, rigid material that is typically used in manufacturing bicycle frames. The tubular hanger part 216 has a first open end 218 and a second open end 220.

The bicycle bottom bracket assembly 212 rotatably supports a crank axle 224 within a tubular hanger part 216. In particular, the bicycle bottom bracket assembly 212 includes a first support member 226, a second support member 228, a first bearing unit 230, a second bearing unit 232 for rotatably supporting the crank axle 224 within the tubular hanger part 216, and further includes a first sealing structure 234, a second sealing structure 236 and a connecting tube member 238. The crank axle 224, the first bearing unit 230, the second bearing unit 232 and the connecting tube member 238 are substantially similar to the crank axle 24, the first bearing unit 30, the second bearing unit 32 and the connecting tube member 38, respectively, that are discussed above.

As seen in FIG. 12, the first sealing structure 234 includes a first axially inner seal member 251 and/or a first axially outer seal member 252, and, preferably, further includes a first seal guard 253 and a first auxiliary cover 254. The first sealing structure 234 is operatively disposed between the first support member 226 and the first bearing unit 230 to create a seal for preventing the ingress of water and/or other contaminates from reaching the first bearing unit 230. With the second illustrated bottom bracket embodiment, the first sealing structure 234 provides a reliable sealing structure and constitutes a lower rotational torque seal structure that prevents water from reaching the first bearing unit 230.

The first axially inner seal member 251 is an elastomeric, ring shaped member that preferably has a uniform cross sectional profile. The first axially inner seal member 251 has a proximal end 251a and a distal end 251b. The proximal end 251a is fixed to the first support member 226 at a location axially inward from the first bearing unit 230 with respect to the rotational central axis A of the first bearing unit 230. The proximal end 251a can be press-fitted into the first support member 226 with or without an adhesive disposed in-between. A watertight seal is created at the interface between the surfaces of the proximal end 251a and the first support member 226.

The first axially outer seal member 252 is an elastomeric, ring shaped member that preferably has a uniform cross sectional profile. The first axially outer seal member 252 has a proximal end 252a and a distal end 252b. The proximal end 252a is fixed to the first support member 226 at a location axially outward from the first bearing unit 230 with respect to the rotational central axis A of the first bearing unit 230. The proximal end 252a of the first axially outer seal member 252 can be press-fitted into the first support member 226 with or without an adhesive disposed in-between. A watertight seal is created at the interface between the surfaces of the proximal end 252a of the first axially outer seal member 252 and the first support member 226. The distal, end 252b slidably contacts the first bearing unit 230 to create a watertight seal therebetween.

The first seal guard 253 is a non-metallic, ring shaped member. Preferably, the first, seal guard 253 is formed as a hard resinous member. The first seal guard 253 may also be made of a metallic material, such as aluminum. The first seal guard 253 supports the first bearing unit 230. Thus, the first seal guard 253 is disposed between the crank axle 224 and the first bearing unit 230 such that the first seal guard 253 supports the first bearing unit 230 on the crank axle 224. The first seal guard 253 cooperates with the first auxiliary cover 254 to aid in minimizing containments from reaching the first bearing unit 230. In the second illustrated bottom bracket embodiment, the first seal guard 253 has an axially extending part 253a and a radially extending part 253b. Thus, the axially extending part 253a has a generally cylindrical or tubular shape, while the radially extending part 253b extends in a radial direction from the axially extending part 253a. The axially extending part 253a preferably retains the first bearing unit 230. For example, as in the second illustrated bottom bracket embodiment, the axially extending part 253a has a recess in its outer circumferential surface that snugly receives the first bearing unit 230.

The first auxiliary cover 254 is a metallic, ring shaped member. The first auxiliary cover 254 may also be made of a non-metallic material, such as resin. The first auxiliary cover 254 is disposed between the first support member 226 and the first seal guard 253 such that the first auxiliary cover 254 overlaps the first seal guard 253 as viewed in a direction parallel to the rotational central axis A of the first hearing unit 230. In particular, the first auxiliary cover 254 has an L-shaped cross sectional profile with an axially extending part 254a and a radially extending part 254b. The radially extending part 253b of the first seal guard 253 and the radially extending part 254b of the first auxiliary cover 254 are arranged to form a labyrinth structure. This labyrinth structure formed by the radially extending parts 253b and 254b is positioned at a location axially outward from the first axially outer seal member 252 with respect to the rotational central axis A of the first bearing unit 230.

As seen in FIGS. 12 and 13, the second sealing structure 236 includes a second axially inner seal member 261 and/or a second axially outer seal member 262, and, preferably, further includes a second seal guard 263 and a second auxiliary cover 264. The second sealing structure 236 is operatively disposed between the second support member 228 and the second bearing unit 232 to create a seal for preventing the ingress of water and/or other contaminates from reaching the second bearing unit 232. With the second illustrated bottom bracket embodiment, the second sealing structure 236 provides a reliable sealing structure and constitutes a lower rotational torque seal structure that prevents water from reaching the second bearing unit 232.

The second axially inner seal member 261 is an elastomeric, ring shaped member that preferably has a uniform cross sectional profile. The second axially inner seal member 261 has a proximal end 261a and a distal end 261b. The proximal end 261a is fixed to the second support member 228 at a location axially inward from the second bearing unit 232 with respect to the rotational central axis A of the second bearing unit 232. The proximal end 261a can be press-fitted into the second support member 228 with or without an adhesive disposed in-between. A watertight seal is created at the interface between the surfaces of the proximal end 261a and the second support member 228.

The second axially outer seal member 262 is an elastomeric, ring shaped member that preferably has a uniform cross sectional profile. The second axially outer seal member 262 has a proximal end 262a and a distal end 262b. The proximal end 262a of the second axially outer seal member 262 is fixed to the second support member 228 at a location axially outward from the second bearing unit 232 with respect to the rotational central axis A of the second bearing unit 232. The proximal end 262a of the second axially outer seal member 262 can be press-fitted into the second support member 228 with or without an adhesive disposed in-between. A watertight seal is created at the interface between the surfaces of the proximal end 262a of the second axially outer seal member 262 and the second support member 228. The distal end 262b slidably contacts an inner race 282 of the second bearing unit 232 to create a watertight seal therebetween.

The second seal guard 263 is a non-metallic, ring shaped member. Preferably, the second seal guard 263 is formed as a hard resinous member. The second seal guard 263 may also be made of a metallic material, such as aluminum. The second seal guard 263 supports the second bearing unit 232. Thus, the second seal guard 263 is disposed between the crank axle 224 and the second bearing unit 232 such that the second seal guard 263 supports the second bearing unit 232 on the crank axle 224. As explained below, the second seal guard 263 cooperates with the second auxiliary cover 264 to aid in minimizing containments from reaching the second bearing unit 232. In the second illustrated bottom bracket embodiment, the second seal guard 263 has an axially extending part 263a and a radially extending part 263b. Thus, the axially extending part 263a has a generally cylindrical or tubular shape, while the radially extending part 263b extends in a radial direction from the axially extending part 263a. The axially extending part 263a preferably retains the second bearing unit 232. For example, as in the second illustrated bottom bracket embodiment, the axially extending part 263a has a recess in its outer circumferential surface that snugly receives the second bearing unit 232.

The second auxiliary cover 264 is a metallic, ring shaped member. The second auxiliary cover 264 may also be made of a non-metallic material, such as resin. The second auxiliary cover 264 is disposed between the second support member 228 and the second seal guard 263 such that the second auxiliary cover 264 overlaps the second seal guard 263 as viewed in a direction parallel to the rotational central axis A of the second bearing unit 232. In particular, the second auxiliary cover 264 has an L-shaped cross sectional profile with an axially extending part 264a and a radially extending part 264b. The radially extending part 263b of the second seal guard 263 and the radially extending part 264b of the second auxiliary cover 264 are arranged to form a labyrinth structure. This labyrinth structure formed by the radially extending parts 263b and 264b is positioned at a location axially outward from the second axially outer seal member 262 with respect to the rotational central axis A of the second bearing unit 232.

Here, in the bicycle bottom bracket assembly 212, the first and second hanger mounting portions 246 and 256 of the first and second support members 226 and 228 are resinous members that are installed in open ends 218 and 220 of a tubular hanger part 216 of a bicycle frame 214 via press-fit connections.

In view of the similarity between bicycle bottom bracket assembly 212 and the bicycle bottom bracket assembly 12, previously discussed, the bicycle bottom bracket assembly 212 will not be discussed in further detail herein. Rather, the descriptions of the parts of the bicycle bottom bracket assembly 12 apply to the parts of the bicycle bottom bracket assembly 212, except for the minor differences that are mentioned above.

In accordance with exemplary embodiments of the present invention, a radially inward force reducing structure reduces a radially inward force transmitted to the bearing unit. As seen in FIGS. 2 and 3, the radially inward force reducing structure in accordance with a first exemplary embodiment of the present invention includes a non-threaded outer circumferential surface 110 of the second support member 28. The non-threaded outer circumferential surface 110 of the second support member 28 is disposed radially outward of the outer race 80 of the second bearing unit 32 in a state where the second bearing unit 32 is mounted to the second bearing mounting portion 58 of the second support member 26. A first axial length L1 of the non-threaded outer circumferential surface 110 of the second support member 28 is equal to or larger than a diameter D of the at least one roller element 84. As shown in FIG. 3, the non-threaded outer circumferential surface 110 is disposed between two threaded outer circumferential surfaces 56a of the second hanger mounting portion 56. As shown in FIG. 2, the first support member 26 can be similarly configured. By disposing the non-threaded outer circumferential surface radially outward of the bearing unit, a vertical force resulting from threading the support member into the hanger part and transmitted to the bearing unit is reduced.

Figure 4:
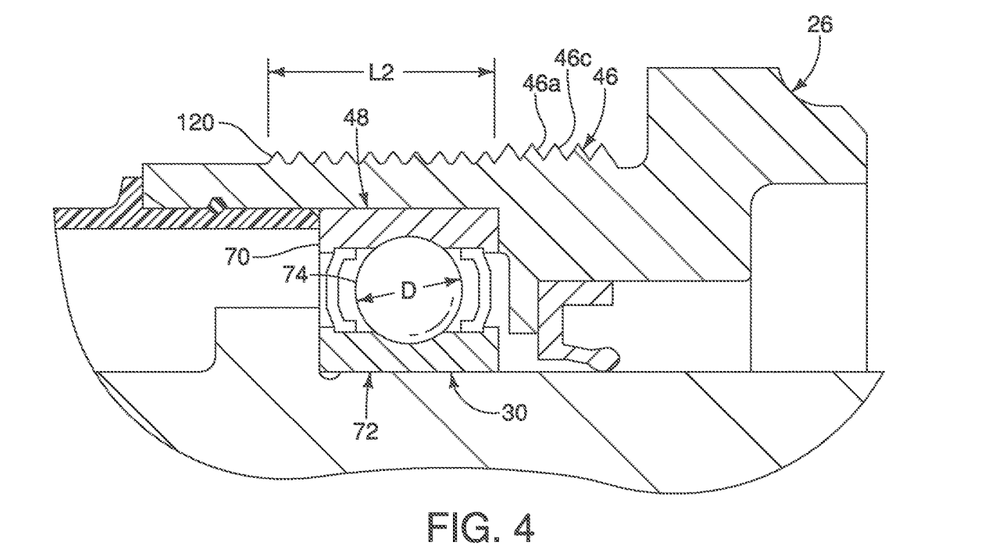
FIG. 4 is an enlarged cross sectional view of a bicycle bottom bracket assembly in accordance with a second exemplary embodiment in which a first thread height is smaller than a second thread height of a threaded outer circumferential surface of a support member.

As seen in FIG. 4, the radially inward force reducing structure in accordance with a second exemplary embodiment of the present invention includes a first threaded portion 120 and a second threaded portion 46c formed in the threaded outer circumferential surface 46a of the first support member 26. The first threaded portion 120 has a first thread height, and the second threaded portion 46c has a second thread height. The first thread height is smaller than the second thread height, as shown in FIG. 4. The first threaded portion 120 is disposed radially outward of the outer race 70 of the first bearing unit 30. A second axial length L2 of the first threaded portion 120 is equal to or larger than the diameter D of the at least one roller element 74. The second support member 28 can be similarly configured. By disposing the smaller thread height portion of the threaded outer circumferential surface radially outward of the bearing unit, a vertical force resulting from threading the support member into the hanger part and transmitted to the bearing unit is reduced.

Figure 5:
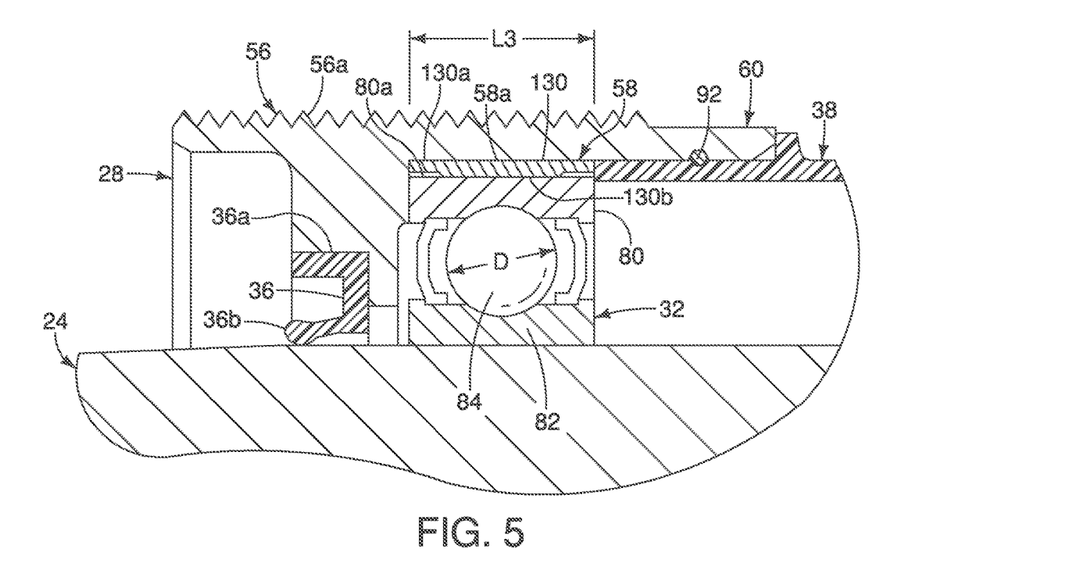
FIG. 5 is an enlarged cross sectional view of a bicycle bottom bracket assembly in accordance with a third exemplary embodiment in which a deformable member is disposed radially between a support member and a bearing unit.

As seen in FIG. 5, the radially inward force reducing structure in accordance with a third exemplary embodiment of the present invention includes a deformable member 130 disposed radially between the second bearing mounting portion 58 of the second support member 28 and the outer race 80 of the second bearing unit 32. The deformable member 130 is preferably a substantially tubular member having an outer circumferential surface 130a and an inner circumferential surface 130b. The outer circumferential surface 130a of the deformable member 130 is disposed adjacent the inner circumferential surface 58a of the second bearing mounting portion 58. The inner circumferential surface 130b of the deformable member 130 is disposed adjacent an outer circumferential surface of the outer race 80. The deformable member 130 has a third axial length L3 that is equal to or larger than the diameter D of the at least one roller element 84. The deformable member can have any suitable shape. The deformable material is preferably made of an elastically deformable material that is softer than the material from which the support member is made, such as a polyamide (nylon) or an elastic adhesive. The first support member 26 can be similarly configured such that a deformable member is disposed radially between the first support member 26 and the outer race 80 of the first bearing unit 30. The deformable member is equally applicable to the support members of the bicycle bottom bracket assembly 212 in accordance with the second bottom bracket embodiment. The deformable member reduces the radially inward force transmitted to the bearing unit when threading or press-fitting the support member to the hanger part.

Figure 6:
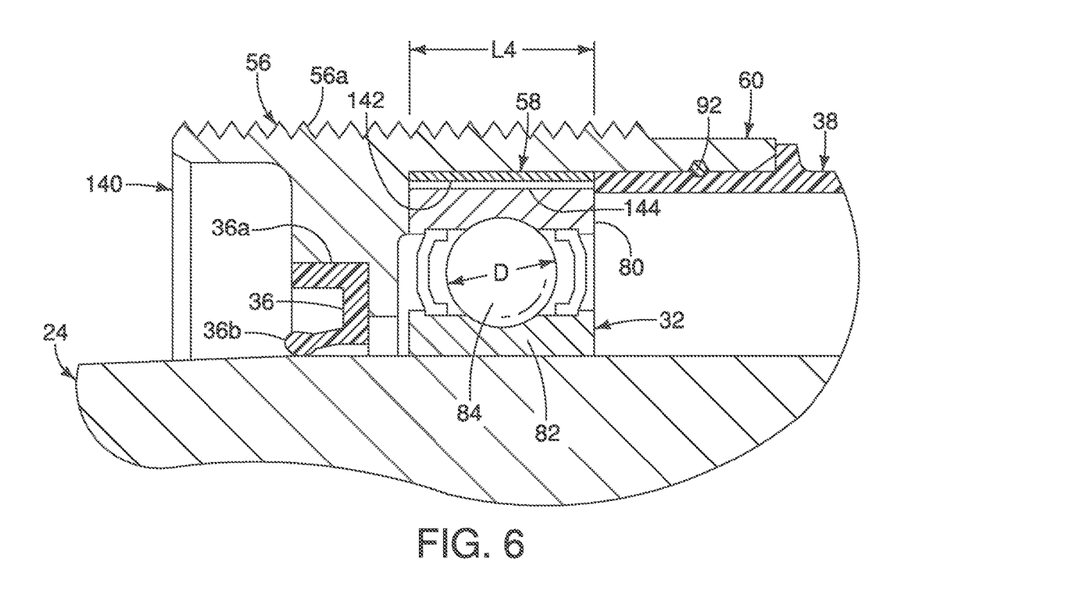
FIG. 6 is an enlarged cross sectional view of the bicycle bottom bracket assembly in accordance with a fourth exemplary embodiment in which a second support member has an inner circumferential surface having a plurality of radially extending recesses.

As seen in FIG. 6, the radially inward force reducing structure in accordance with a fourth exemplary embodiment of the present invention includes a second support member 140 having an inner circumferential surface 144 having a plurality of radially extending recesses 142 configured to reduce a surface area contacting the outer race 80 of the second bearing unit 32 in a state where the second bearing unit 32 is mounted to the second bearing mounting portion 58 of the second support member 140. The plurality of recesses 142 reduce the total surface area of the inner circumferential surface 144 of the second bearing mounting portion 58 that contacts the outer race 80 of the second bearing unit 32, thereby reducing the radially inward force transmitted to the second bearing unit 32. For example, approximately thirty percent of the inner circumferential surface 144 contacts the outer race 80 of the second bearing unit 32. Each of the plurality of recesses 142 has a fourth axial length L4 equal to or larger than the diameter D of the at least one roller element 84. The support member 140 is substantially similar to the second support member 28 of FIG. 2 with the above-noted exceptions.

Figure 7:
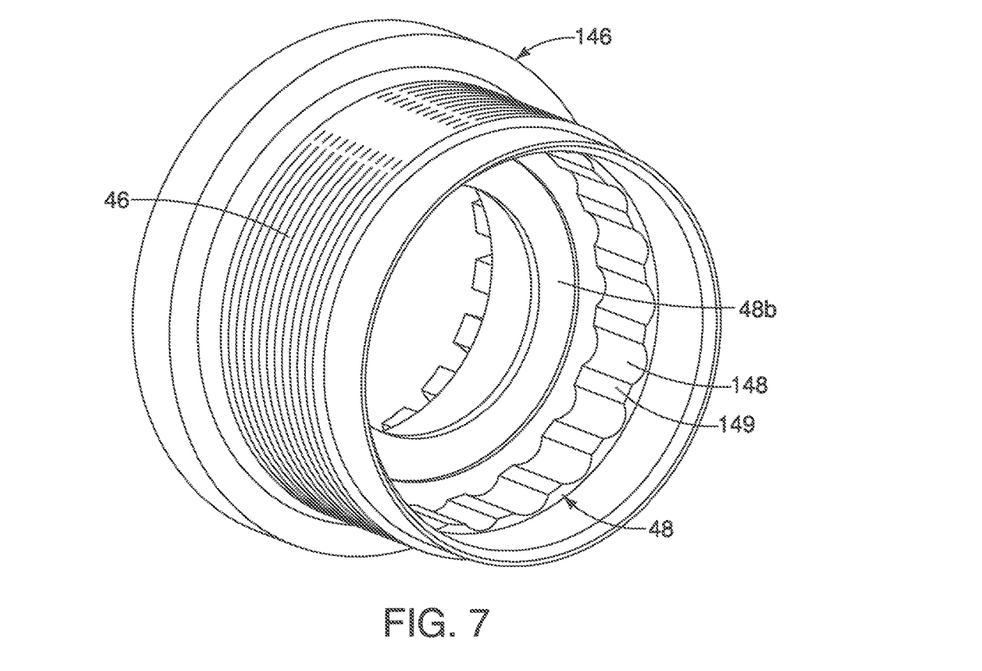
FIG. 7 is a perspective view of a first support member of the bicycle bottom bracket assembly having a plurality of radially extending recesses in accordance with the fourth exemplary embodiment of the present invention of FIG. 6.

A first support member 146 in accordance with, the fourth exemplary embodiment of the present invention is substantially similar to the first support member 26 of FIG. 2 with the following exceptions. As seen in FIG. 7, the first support member 146 is similarly configured as the second support member 140 of FIG. 6. A plurality of recesses 148 reduce the total surface area of the inner circumferential surface 149 of the first bearing mounting portion 48 that contacts the outer race 70 (FIG. 2) of the first bearing unit 30, thereby reducing the radially inward force transmitted to the first bearing unit 30. The plurality of recesses 148 have an axial length extending outwardly from the axially facing surface 48b of the first bearing mounting portion 48. The first and second support members 146 and 140 in accordance with the fourth exemplary embodiment of the present invention are equally applicable to the support members of the bicycle bottom bracket assembly 212 in accordance with the second bottom bracket embodiment.

Figure 8:
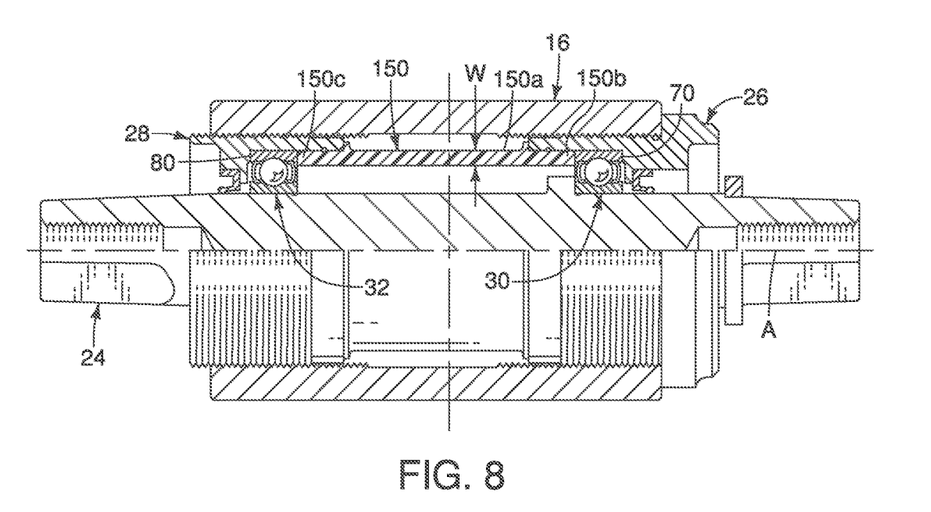
FIG. 8 is a cross sectional view of a bicycle bottom bracket assembly received by the tubular hanger part illustrated in FIG. 1 in accordance with a fifth exemplary embodiment in which a connecting tube has an increased wall thickness.

As seen in FIG. 8, the radially inward force reducing structure in accordance with a fifth exemplary embodiment of the present invention includes a connecting tube 150 disposed axially inward of the first bearing unit 30. The connecting tube 150 has an outer circumferential surface 150a configured to be mounted to the first support member 26. The connecting tube 150 has a first end 150b disposed adjacent to the outer race 70 of the first bearing unit 30 and a second end 150c disposed adjacent to the outer race 80 of the second bearing unit 32. The outer circumferential surface 150a of the connecting tube 150 is configured to be mounted to the first and second support members 26 and 28. The connecting tube 150 preferably has a wall thickness W equal to or larger than 2.0 mm. The increased wall thickness of the connecting tube 150, which is larger than a wall thickness of a conventional connecting tube (1.2 mm), increases the rigidity of the connecting tube 150, thereby reducing the radially inward force transmitted to the first and second bearing units 30 and 32. The connecting tube 150 can be made of any suitable material, such as a resin material, aluminum or iron. The connecting tube in accordance with the fifth exemplary embodiment of the present invention is equally applicable to the bicycle bottom bracket assembly 212 in accordance with the second bottom bracket embodiment. The connecting tube prevents deformation of the bearing unit when threading or press-fitting the support member into the hanger part, thereby reducing a radially inward force being transmitted to the bearing unit.

Figure 9:
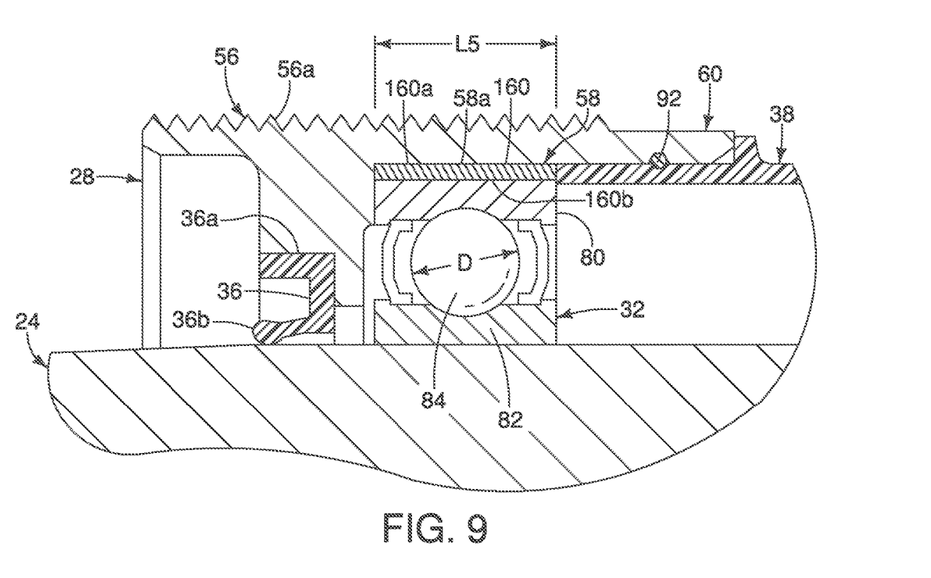
FIG. 9 is an enlarged cross sectional view of a bicycle bottom bracket assembly in accordance with a sixth exemplary embodiment in which a rigid member is disposed radially between a support member and a bearing unit.

As seen in FIG. 9, the radially inward force reducing structure in accordance with a sixth exemplary embodiment of the present invention includes a rigid member 160 disposed radially between the second bearing mounting portion 58 of the second support member 28 and the outer race 80 of the second bearing unit 32. The rigid member 160 is preferably a substantially tubular member having an outer circumferential surface 160a and an inner circumferential surface 160b. The outer circumferential surface 160a of the rigid member 160 is disposed adjacent to the inner circumferential surface 58a of the second bearing mounting portion 58. The inner circumferential surface 160b of the rigid member 160 is disposed adjacent to an outer circumferential surface of the outer race 80. The rigid member 160 has a fifth axial length L5 that is equal to or larger than the diameter D of the at least one roller element 84. The rigid member 160 can have any suitable shape. The rigid member 160 can be made of any suitable material, such as iron, titanium or aluminum (preferably when the support member is made of a non-metallic material). The first support member 26 can be similarly configured. The rigid member in accordance with the sixth exemplary embodiment of the present invention is equally applicable to the support members of the bicycle bottom bracket assembly 212 in accordance with the second bottom bracket embodiment. By disposing the rigid member radially between the bearing unit and the support member, deformation of the support member is substantially prevented and a radially inward force being transmitted to the bearing unit is reduced.

Figure 10:
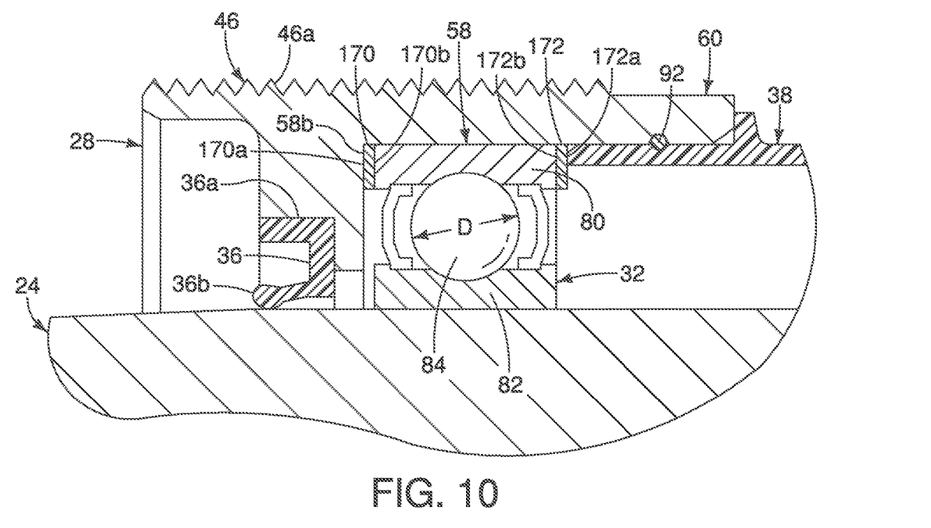
FIG. 10 is an enlarged cross sectional view of a bicycle bottom bracket-assembly in accordance with a seventh exemplary embodiment in which first and second rigid members are disposed on opposite axial ends of a bearing unit.

As seen in FIG. 10, the radially inward force reducing structure in accordance with a seventh exemplary embodiment of the present invention includes first and second rigid members 170 and 172 disposed on opposite axial ends of the outer race 80 of the second bearing unit 32. The first and second rigid members 170 and 172 preferably have substantially annular shapes. The first rigid member 170 has an outer axially facing surface 170a facing the axially facing surface 58b of the second bearing mounting portion 58. An inner axially facing surface 170b of the first rigid member 170 faces the outer race 80 of the second bearing unit 32. The second rigid member 172 has an outer axially facing surface 172a facing an end of the connecting tube 38. An inner axially facing surface 172b of the second rigid member 172 faces the outer race 80 of the second bearing unit 32. Each of the first and second rigid members have a radial thickness equal to or larger than a radial thickness of the outer race 80 of the second bearing unit. The first and second rigid members 170 and 172 can be made of any suitable material, such as iron, titanium or aluminum (preferably when the support member is made of a non-metallic material). The first support member 26 can be similarly configured. The first and second rigid members in accordance with the seventh exemplary embodiment of the present invention are equally applicable to the bicycle bottom bracket assembly 212 in accordance with the second bottom bracket embodiment. By disposing the first and second rigid members on opposite axial ends of the bearing unit, deformation of the support member is substantially prevented and a radially inward force being transmitted to the bearing unit is reduced.

As seen in FIGS. 12 and 13, the radially inward force reducing structure in accordance with an eighth exemplary embodiment of the present invention includes a groove 296 disposed in an outer circumferential surface 228a of the second hanger mounting portion 256 radially outward of the outer race 280 of the second bearing unit 232. The groove 296 extends radially inwardly from the outer circumferential surface 228a toward the outer race 280. The groove 296 can have any suitable shape, such as, but not limited to, an isosceles trapezoid shown in FIGS. 12 and 13, a rectangle, a semi-circle, or be substantially V-shaped. The groove 296 has a sixth axial length L6 that is equal to or larger than a diameter D of the at least one roller element 284. As shown in FIG. 12, the first support member 226 can be similarly configured such that a groove 298 is disposed in an outer circumferential surface 226a of the first hanger mounting portion 246 radially outward of the outer race 270 of the first bearing unit 230. The groove forms a gap radially disposed between the hanger part of the bicycle frame and the support member, thereby reducing the radially inward force being transmitted to the bearing unit when press-fitting the support member to the hanger part.

Figure 14:
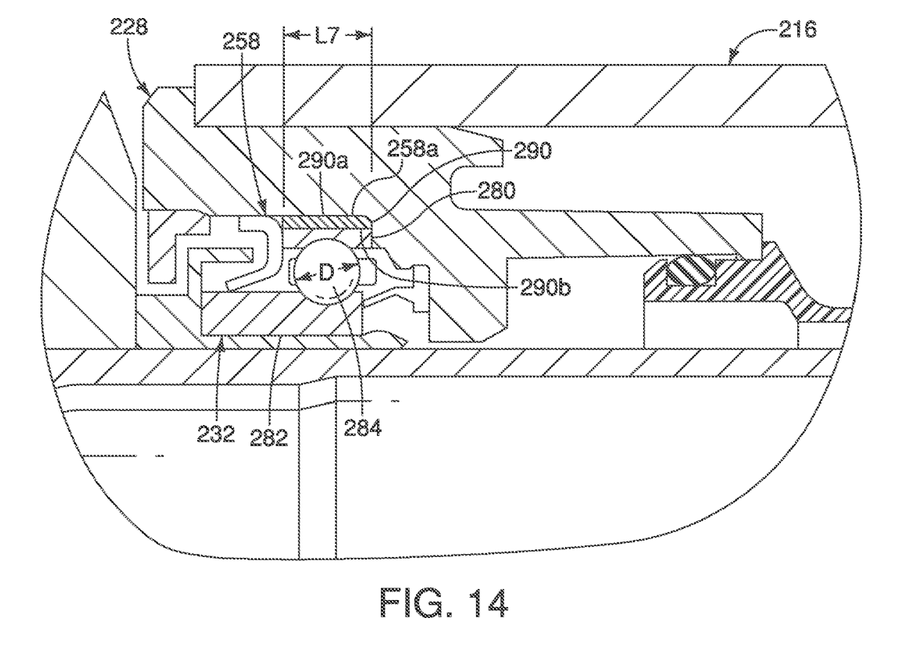
FIG. 14 is an enlarged cross sectional view of a bicycle bottom bracket assembly in accordance with a ninth exemplary embodiment in which a deformable member is disposed between a support member and a bearing unit.

As seen in FIG. 14, the radially inward force reducing structure in accordance with a ninth exemplary embodiment of the present invention includes a deformable member 290 disposed radially between a second bearing mounting portion 258 of the second support member 228 and the outer race 280 of the second bearing unit 232. The deformable member 290 is preferably a substantially tubular member having an outer circumferential surface 290a and an inner circumferential surface 290b. The outer circumferential surface 290a of the deformable member 290 is disposed adjacent to the inner circumferential surface 258a of the second bearing mounting portion 258. The inner circumferential surface 290b of the deformable member 290 is disposed adjacent to an outer circumferential surface of the outer race 280. The deformable member 290 has a seventh axial length L7 that is equal to or larger than the diameter D of the at least one roller element 284. The deformable member can have any suitable shape. The deformable material is preferably made of an elastically deformable material that is softer than the material from which the support member is made, such as a polyamide (nylon) or an elastic adhesive. The first support member 226 can be similarly configured. The deformable member reduces the radially inward force being transmitted to the bearing unit when threading or press-fitting the support member to the hanger part.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired unless otherwise specified. Components that are shown directly connected or contacting each other can have intermediate structures disposed between them unless otherwise specified. The functions of one element can be performed by two, and vice versa unless otherwise specified. It is not necessary for all advantages to be present in a particular embodiment at the same time. Every feature which is unique from the prior art, alone or in combination with other features, also should be considered a separate description of further inventions by the applicant including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle bottom bracket assembly having a rotational central axis, the bicycle bottom bracket comprising:
   a support member including a hanger mounting portion and a bearing mounting portion, the bearing mounting portion being configured to be at least partly positioned within a hanger part of a bicycle frame, the hanger mounting portion of the support member having a threaded outer circumferential surface configured to be threadably received by an open end of the hanger part of the bicycle frame;
   a bearing unit including an outer race, an inner race and at least one roller element disposed between the outer and inner races in a radial direction with respect to the rotational central axis, the outer race being fixed to the bearing mounting portion of the support member; and
   a radially inward force reducing structure for reducing a radially inward force being transmitted to the bearing unit, the radially inward force reducing structure being configured to be disposed radially outward of the outer race with respect to the rotational center axis, the radially inward force reducing structure including a first threaded portion and a second threaded portion formed in the threaded outer circumferential surface of the support member, the first threaded portion and the second threaded portion having a first thread height and a second thread height, respectively, the first thread height being smaller than the second thread height.

2. The bicycle bottom bracket assembly according to claim 1, wherein
   the first threaded portion is disposed radially outward of the outer race of the bearing unit.

3. The bicycle bottom bracket assembly according to claim 2, wherein
   a second axial length of the first threaded portion is equal to or larger than a diameter of the at least one roller element.

4. A bicycle bottom bracket assembly having a rotational central axis, the bicycle bottom bracket comprising:
   a support member including a hanger mounting portion and a bearing mounting portion, the bearing mounting portion being configured to be at least partly positioned within a hanger part of a bicycle frame;
   a bearing unit including an outer race, an inner race and at least one roller element disposed between the outer and inner races in a radial direction with respect to the rotational central axis, the outer race being fixed to the bearing mounting portion of the support member, the inner race being configured to receive a crank axle such that the roller element is radially spaced from the crank axle; and
   a radially inward force reducing structure for reducing a radially inward force being transmitted to the bearing unit, the radially inward force reducing structure being configured to be disposed axially adjacent to the outer race with respect to the rotational center axis, the radially inward force reducing structure including a rigid member contacting the outer race and the support member, a radial thickness of the rigid member being equal to or larger than a radial thickness of the outer race, a portion of the rigid member being configured to be disposed radially inward of a threaded portion of the support member in a direction substantially perpendicular to the rotational central axis, the rigid member being separately formed from the support member.

5. The bicycle bottom bracket assembly according to claim 4, wherein
   the rigid member is a connecting tube disposed axially inward of the bearing unit, the connecting tube having an outer circumferential surface configured to be mounted to the support member and a first wall thickness of the connecting tube being equal to or larger than 2.0 mm.

6. A bicycle bottom bracket assembly having a rotational central axis; the bicycle bottom bracket comprising:
   a support member made of a first material and including a hanger mounting portion and a bearing mounting portion, the bearing mounting portion being configured to be at least partly positioned within a hanger part of a bicycle frame;
   a bearing unit including an outer race, an inner race and at least one roller element disposed between the outer and inner races in a radial direction with respect to the rotational central axis, the outer race being fixed to the bearing mounting portion of the support member, the inner race being configured to receive a crank axle such that the roller element is radially spaced from the crank axle; and
   a radially inward force reducing stricture for reducing a radially inward force being transmitted to the bearing unit, the radially inward force reducing structure being configured to be disposed axially adjacent to the outer race with respect to the rotational center axis, the radially inward force reducing structure including a first rigid member contacting the outer race and the support member and a second rigid member contacting the outer race and the support member, the first and second rigid members being disposed on opposite axial ends of the outer race of the bearing unit, the first and second rigid members being separately formed from the support member, and the first and second rigid members are made of a material different from the first material.

7. The bicycle bottom bracket assembly according to claim 6, wherein
   each of the first and second rigid members has a radial thickness equal to or larger than a radial thickness of the outer race of the bearing unit.

* * * * *